United States Patent
Campanini et al.

(10) Patent No.: US 7,181,056 B2
(45) Date of Patent: Feb. 20, 2007

(54) METHOD, AND CORRESPONDING APPARATUS, FOR AUTOMATIC DETECTION OF REGIONS OF INTEREST IN DIGITAL IMAGES OF BIOLOGICAL TISSUE

(75) Inventors: Renato Campanini, San Giorgio Di Mantova (IT); Matteo Roffilli, Cesena (IT); Nico Lanconelli, Fusignano (IT)

(73) Assignee: Alma Mater Studiorum Universita' di Bologna, Bologna (IT)

( * ) Notice: Subject to any disclaimer, the term of this patent is extended or adjusted under 35 U.S.C. 154(b) by 687 days.

(21) Appl. No.: 10/321,800

(22) Filed: Dec. 16, 2002

(65) Prior Publication Data

US 2003/0161522 A1 Aug. 28, 2003

(30) Foreign Application Priority Data

Dec. 14, 2001 (IT) .......................... BO2001A0763

(51) Int. Cl.
*G06K 9/00* (2006.01)
(52) U.S. Cl. .................. 382/132; 382/224; 378/21
(58) Field of Classification Search ................ 382/128, 382/129, 130, 131, 132, 133, 134, 181, 190, 382/224, 227, 232, 250, 260, 274, 282, 283, 382/295, 305, 168; 378/37, 21, 23; 706/12, 706/16; 436/64; 600/300
See application file for complete search history.

(56) References Cited

U.S. PATENT DOCUMENTS 6,248,063 B1 * 6/2001 Barnhill et al. ............. 600/300
6,855,554 B2 * 2/2005 Fritsche et al. ............... 436/64
6,882,700 B2 * 4/2005 Wang et al. .................. 378/37
6,882,990 B1 * 4/2005 Barnhill et al. ............... 706/16
6,961,466 B2 * 11/2005 Imagawa et al. ........... 382/190
6,996,549 B2 * 2/2006 Zhang et al. ................. 706/16
7,016,881 B2 * 3/2006 Li et al. ....................... 706/12

FOREIGN PATENT DOCUMENTS

WO WO 00/72257 A2 11/2000

OTHER PUBLICATIONS

A General Framework for Object Detectionp by Papageorgiou et al., Center for Biological and Computational Learning, publ.. Apr. 1, 1998, pp. 555-562.*
"A General Framework for Object Detection" by Papageorgiou et al., Center for Biological and Computational Learning, publ. Apr. 1, 1998, pp. 555-562.
"Automatic Detection of Clustered Microcalcifications in Digital Mammograms Using SVM Classifier" by Bazzani et al., publ. Apr. 26, 2000, pp. 195-200.

* cited by examiner

Primary Examiner—Matthew C. Bella
Assistant Examiner—Seyed Azarian
(74) Attorney, Agent, or Firm—Sheridan Ross P.C.

(57) ABSTRACT

A method for automatic detection of regions of interest in a digital image representing at least one portion of biological tissue comprises the classification of said regions of interest as suspect region or not, using a classifier referred to as Support-Vector Machine (SVM).

15 Claims, 4 Drawing Sheets

METHOD, AND CORRESPONDING APPARATUS, FOR AUTOMATIC DETECTION OF REGIONS OF INTEREST IN DIGITAL IMAGES OF BIOLOGICAL TISSUE

The present invention relates to a method and an apparatus for automatic detection of regions of interest in digital images of biological tissue.

Even though, in the ensuing description, express reference will be made to the detection of tumoral masses in digital mammographic images, it remains understood that the teachings of the present invention can be applied, with the necessary changes made, to the analysis and processing of any biological tissue coming from any method of investigation, such as, for example, nuclear magnetic resonance (NMR), thermography, ultrasound, single and positron emission techniques, CAT, etc. of the lungs, the digestive system, etc.

BACKGROUND OF THE INVENTION

As is known, the tumoral masses present as clear thickenings with linear dimensions ranging from 3 mm to 20–30 mm, have edges that are fuzzy and vary in type and degree of definition. This type of lesions can vary considerably in optical density, from radiolucent cases (appearing dark in mammography), associated generally with benign lesions, to dense lesions with marked radio-opacity, which are frequently malignant. The masses can be distinguished according to shape, position, size, characteristics at the edge, attenuation of the x-rays (index of density), and effects on the surrounding tissue.

In addition, various combinations of shape and edge may be encountered in practice. The type of combination can provide indications on the malignity of the disease. For example, the spiculated lesions, made up of a radio-opaque central nucleus from which there irradiate linear structures known as spiculae, are considered the most typical manifestation of malignant lesions. In spiculated masses, the dense central nucleus corresponds histologically to the tumoral tissue, whilst the spiculae represent the fibrous reaction of the stroma. The latter is the response of the host organism to onset of the tumour. By "architectural distortion" is meant an area where the normal architecture of the breast is distorted, but no definite tumoral mass is visible. In these cases the radiologist marks the presence of a centre of distortion. Also the tissue asymmetries between the right breast and the left breast may be considered pathological and classified as masses.

The visual manifestation in the mammogram of the shape and edge of a lesion does not only depend upon the physical properties of the lesion, but is also affected by the technique of acquisition of the image and above all by the projection considered. A mass may appear round or oval according to the projection, and its edge may be obscured in a particular projection because superimposed on the lesion (in that perspective) are other structures that are normal in the architecture of the breast. This leads to the need, in some cases, to carry out other mammograms in targeted projections which will enable the real lesions to be distinguished from mere tissue folds or effects of superimposition. From what has been said, it is difficult to identify morphological, directional or structural quantities of the mammographic image that can characterize the lesions sought at any scale and any modalities of occurrence. For this reason, many of the algorithms for detecting masses so far developed have concentrated on the detection of just one type of mass or on the detection of masses at a particular scale of search.

In addition, the algorithms up to now used necessitated information on the characteristics of the mass so that the system could learn so as to be able to locate a mass having those characteristics. Consequently, this information on the masses had to be entered into the system by a skilled operator, with a considerable expenditure in terms of time and at the expense of a loss in the degree of precision with which the critical masses were located.

In order to develop a general and effective technique of detection of lesions presenting different characteristics, with the present invention a new approach to the problem of detecting masses has been adopted.

Considering the complexity of the class of objects to be detected, considering that said objects frequently present characteristics that are very similar to the environment in which they are found, and considering the objective difficulty of modelling this class of objects with few measurable quantities, in the approach proposed herein no modelling has been sought. A classifier has thus been trained to recognize a lesion, using basically the original image or a more efficient representation of the original image, with an information content greater than the information content that would be available if a system of recognition based simply upon the levels of grey were to be used.

According to a preferred embodiment, the choice has been made to use, as a representation of the information to be supplied to the classifier, the coefficients of the wavelet representation in the overcomplete form, said coefficients regarding each portion of image that is to be classified. It is likewise possible to use other types of representation, such as, for instance, the levels of grey of the original image. In the wavelet representation, the structural and morphological characteristics of the image are encoded in a more efficient form from the point of view of the information content. The multiresolution analysis proper to the wavelet transform enables highlighting of the structural properties of the image at different scales of resolution.

In addition, the classification of portions of mammographic image, in a representation with high information content, involves the use of a classifier that is able to act on spaces with thousands of dimensions. An effective classification in said spaces has become possible only recently with the development of the trainable classifiers referred to as Support-Vector Machines (SVMs). The learning strategy that SVMs implement remains efficient also in sparse spaces, so enabling a good generalization even after a training step with a number of examples considerably smaller than the dimensions of the classification space, unlike what occurs for other classic algorithms (MLPs, RBF networks). An SVM may achieve a good classification result, in terms of generalization, if at least one of the following conditions is satisfied:

the expected value of the compression of information of the data is high, i.e., few support vectors englobe the structural information on the classes to be learnt;

the hyperplane that separates the two classes is the one that maximizes the distance between the classes themselves, i.e., the classes are well separated within the space of the characteristics;

the dimensions of the input space are few as compared to the number of examples presented.

Furthermore, SVMs perform a sort of automatic check on the information carried by the various characteristics, so enabling a selection thereof.

This is done in two ways:

(1)—only some of the vectors of the two classes determine the decision function, said vectors being referred to as support vectors; in this way, the SVM selects that part of the training vectors which, in the chosen space of the characteristics, carry all the information useful for defining the classes; for the SVM it is not important to know fully how the learning data are distributed in the space of the characteristics; what is important is the behaviour at the edges of the distribution in said space;

(2)—the decision function is the hyperplane of maximum margin, defined by the pair $\overline{w}$, b where $\overline{w}$ is the vector normal to the hyperplane, a linear combination of the support vectors; the said vector $\overline{w}$ has its larger components along the directions where the data are more separated; i.e., it is directionally more aligned to the base vectors of the space for which the data are more separated; moreover, adding a dimension for which the learning data are totally superimposed, will not vary the hyperplane of separation chosen by the SVM.

Given the ability of the SVM to check multidimensional spaces, at the same time maintaining a good generalization capacity, there has emerged the possibility of eliminating or limiting the step of extraction of the characteristics for a classification task. The automatic search approach adopted by the present invention presents a further advantage, as compared to the methods currently in use, in regard to the fact that the system automatically adapts to the type of images that it has to analyse (x-rays, mammograms, tomograms, NMR scans, etc.), irrespective of the type of machinery used to acquire the image and the conditions of acquisition.

SUMMARY OF THE INVENTION

Consequently, the main purpose of the present invention is to provide a method for automatic detection of regions of interest in a digital image representing at least one portion of biological tissue, said method comprising the step of classification of said regions of interest as a suspect region or not, using a classifier referred to as Support-Vector Machine (SVM).

A further purpose of the present invention is a piece of equipment designed to implement the main method forming the subject of the present invention.

BRIEF DESCRIPTION OF THE DRAWINGS

The present invention will now be described with reference to the annexed drawings, which illustrate a non-limiting example of embodiment, and in which.

DETAILED DESCRIPTION OF THE INVENTION

Figure 1:
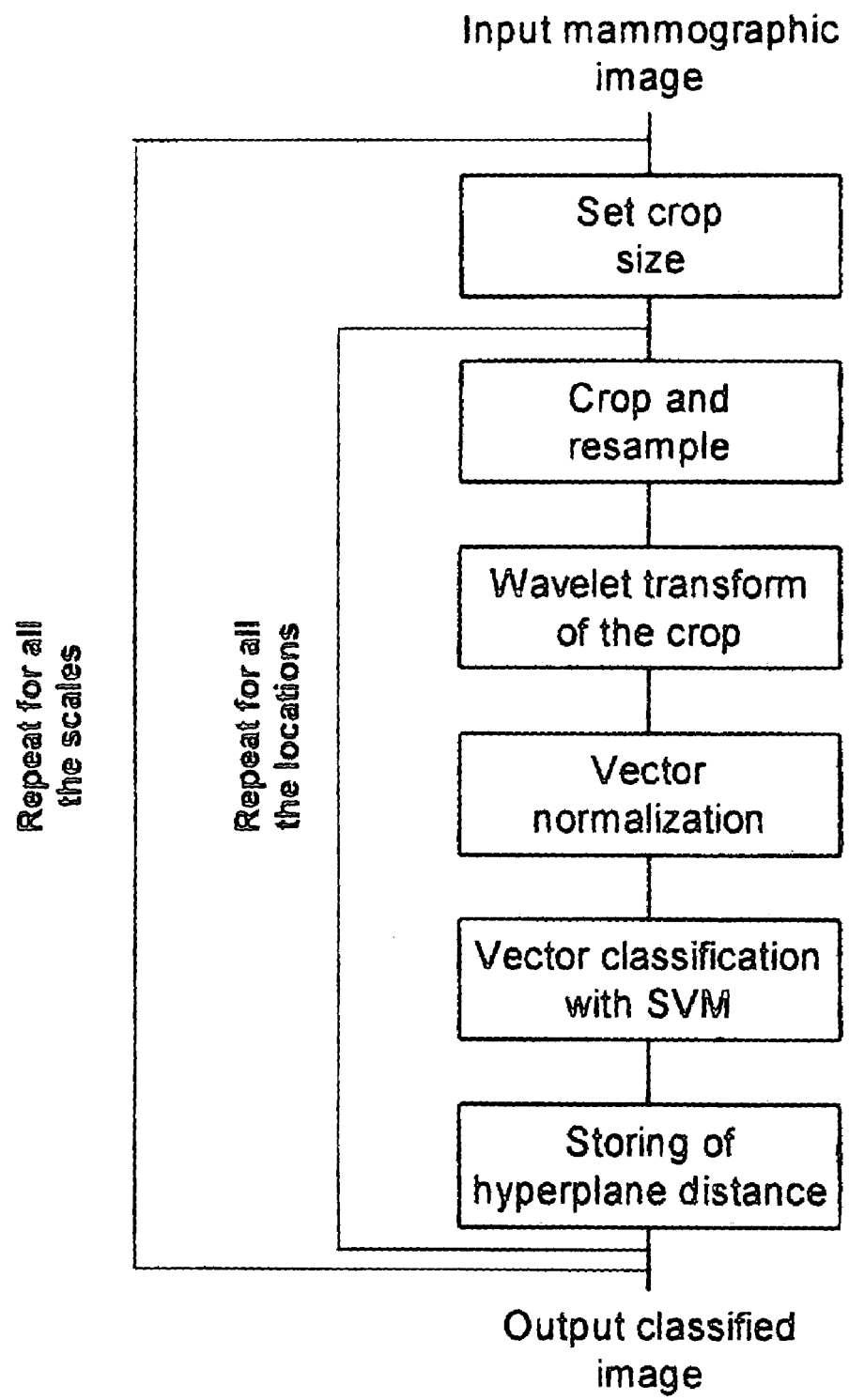
FIG. 1 illustrates a block diagram of an embodiment of a method of automatic detection according to the present invention.

The algorithm proposed in the present invention encodes all the regions of the image in the form of numeric vectors, the said vectors being then classified as positive or negative by means of an SVM classifier. The regions judged to be suspect by the system correspond to the positive vectors.

Wavelets offer a representation of the image that is particularly suitable for highlighting structural, geometrical and directional characteristics of the objects within the image. SVM classifiers are able to extract information from representations of the data without any prior knowledge of the pattern being encoded in the architecture of the classifier or in the design of the characteristics by the researcher. It is these two observations that the application proposed herein takes as its starting point.

The system detects lesions whatever position these may occupy and at different scales in the input mammographic image. To achieve this, an SVM classifier is trained to classify as a positive object a square centred on the mass considered. Once the classifier has been trained, the system detects a lesion in a generic position by scanning and classifying all the possible locations of the image with the passage of a detection window of fixed size. By combining the scanning pass with an iterated resizing of the window, multiscale detection is achieved. Each square classified as positive identifies, in the mammographic image, an area judged as suspect by the system. It is to be noted that the problem of detection has been reduced to a problem of binary classification of the "positive-class"-"non-positive-class" type.

The classifier receives at input row vectors. Then, for classification, a numeric vector is made to correspond to each square via a process of vector encoding. The wavelet-decomposition coefficients are organized in vector form and normalized. The number of components of said vector, given the same type of vector-encoding configuration chosen, is determined by the size of the square produced by the scanning procedure. Consequently, in order to obtain dimensionally homogeneous vectors in the classification step, all the squares produced must be of the same size.

In full operating conditions, the system is made up of four main logic modules, namely:

a module for image pre-processing and production of crops;

a vector-encoding module for each crop;

a vector-classification module; and an output-display module.

The modules operate in cascaded fashion, i.e., the output from each module constitutes the input of the next module. The training module of the classifier is integrated in the classification module. The training module does not operate in full operating conditions but implements the step of production of the learning model for classification.

The learning model, once produced, is stored in the form of a configuration of classification parameters. At the moment of use of the system, it is sufficient to read from the learning model, i.e., it is sufficient to use the classification parameters identified by the model.

The four logic modules considered above identify the main steps of processing of the data. Each step is implemented by various computer processing modules, each of which performs a specific function of the chain of operations that lead from the input, i.e., a digital mammogram to be examined, to the output, represented by the same input mammographic image on which the regions judged as being suspect by the system are indicated.

FIG. 1 shows the sequence of processing steps implemented by the detection algorithm; in what follows, the processing steps illustrated in the figure will be analysed.

Figure 2:
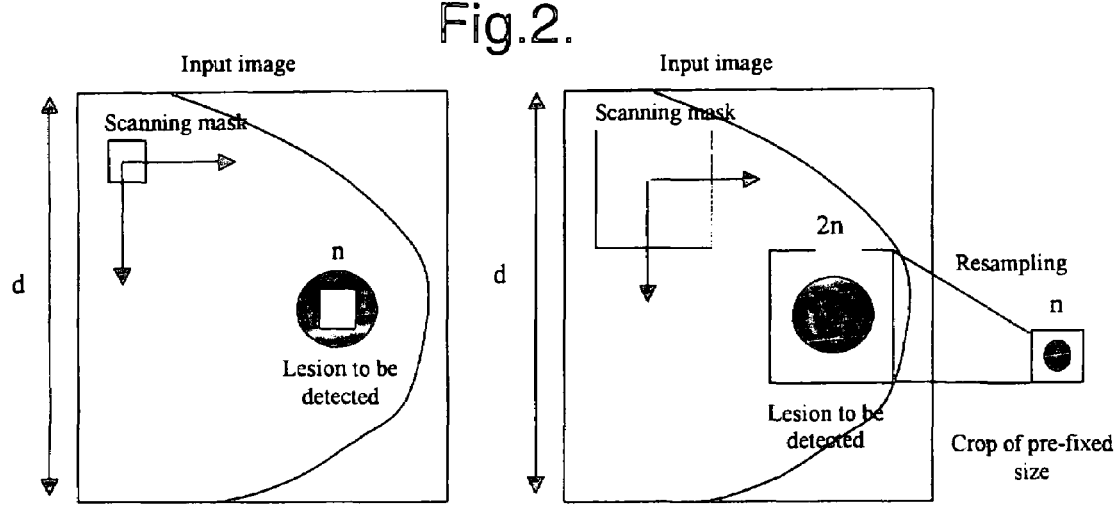
FIG. 2 shows an example of the crop and resample step.

In effect, the lesions that are sought occur at different scales in the mammogram, typically in a range of linear dimensions from 3 mm to the 20–30 mm. There thus emerges the problem of making a scan of the image at different scales, with the constraint of having to present to the classifier dimensionally homogeneous vectors. Given the architecture of the system, the size of the vectors to be classified are strictly linked to the size of the window extracted during the scanning step. The dimensional constraint imposed by the classifier thus results in a physical constraint on the extent of the windows produced in the scanning step. Consequently, the solution implemented is that of using scanning masks of different dimensions and resampling the crops of the image extracted from that mask to a pre-fixed size. In this way, the scanning mask exhibits, at border, homogeneous behaviour as achieved in the training step and will produce, at all the scales, crops of the same size, which will represent regions of different total area within the mammogram, according to what is illustrated in FIG. 2.

Figure 3:
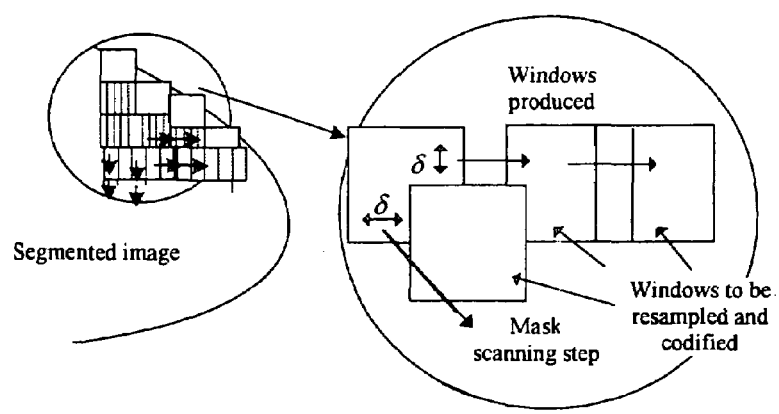
FIG. 3 illustrates a passage from the scanning mask with a step δ.

For example, let us consider an input mammographic image of 4000×3000 pixels and three scale targets of 640×640, 320×320 and 213×213 pixels. The desired dimension (64×64 pixels) of the window to which apply the wavelet transform is obtained by resampling, with an interpolation algorithm, the crops of 640×640, 320×320 and 213×213 pixels to 10%-, 20%- and 30%-, respectively. By breaking down the resampling process into a number of iterated steps until the desired scale is obtained, it is possible to maintain the structural information and contrast information within the image that is sufficient for the classification thereof, as illustrated in FIG. 3.

In the preferred embodiment, the window to which apply the wavelet transform is chosen with a target size of 64×64 pixels. This choice is a compromise between the advantage of having masks as big as possible, so as to reduce loss of information to a minimum in the step of undersizing of the window, and the computational feasibility of the detection process as a whole.

The need to have superimposition of the scanning squares is dictated by constraints of coherence with the set of positive examples presented to the classifier during the training process. Each positive example is a portion of a digital mammographic image containing a mass. The mass is contained completely within, and is centred on, the square. The classifier is then trained to recognize as positive a vector corresponding to a square centred (with a certain degree of de-centring tolerance) on a lesion. Without superimposition during scanning, many lesions could fail to be detected because they are not framed or because they are cut away at the boundary between two squares. Superimposition is controlled by the scanning-step parameter; this parameter has a value fixed to a length equal to approximately 1/10 of the extrapolated linear dimensions of the mask at the minimum search scale. For example, if, at the chosen scale, the scanning windows will cover an extrapolated area of approximately 200×200 pixels, the scanning step will be fixed at 20 pixels. This choice will ensure at least one square centred on the lesion at that scale.

The wavelet coefficients constitute a representation of the image, in which the structural, directional, and morphological information content is expressed in an efficient form from the point of view of the information itself. The wavelet coefficients encode the differences in absolute value between the mean values of intensity of grey levels corresponding to different areas and in different directions in the image. In addition, this encoding is performed at different scales. The said coefficients are large in absolute value where there is a marked change in intensity of levels of grey, whereas their value is zero for areas of uniform intensity; in this way, the edges of the objects are visible in the transform. For each image, we have three image matrices of wavelet coefficients corresponding to the horizontal, vertical and diagonal developments. Of each object, then, there will be highlighted the structural properties according to three directional projections. The idea is to provide the classifier with a complete representation of the image, without guiding the generalization of the class with assumptions deriving from our modelling of the pattern. This choice is due to the complexity of the pattern to be detected and to the difficulty of identifying measurable quantities that synthesise properties characterizing the pattern itself with respect to the background represented by normal mammary tissue at different scales.

In the present preferred embodiment of the system, the wavelet transform of the image is used to provide the said representation because it is deemed more suitable for highlighting the structural and morphological characteristics of the pattern sought. For this purpose, the Haar bases and their properties are considered, and finally a technique of overcomplete wavelet decomposition is proposed, which enables the set of coefficients representing the image to be expanded with a redundant code.

In the traditional Haar-wavelet transform, the base functions do not present any spatial superposition. They translate along the axes x, y by amounts corresponding to the extent of their support. In the present invention, the aim has been to increase the resolution of decomposition using a transform for which the scale and wavelet basis functions translate by fractions of their support so as to obtain an overcomplete transform. This overcomplete transform provides a redundant encoding of the data with spatially superposed scale and wavelet basis functions. In this way, the information for each portion of image is distributed over a greater number of coefficients.

Figure 4:
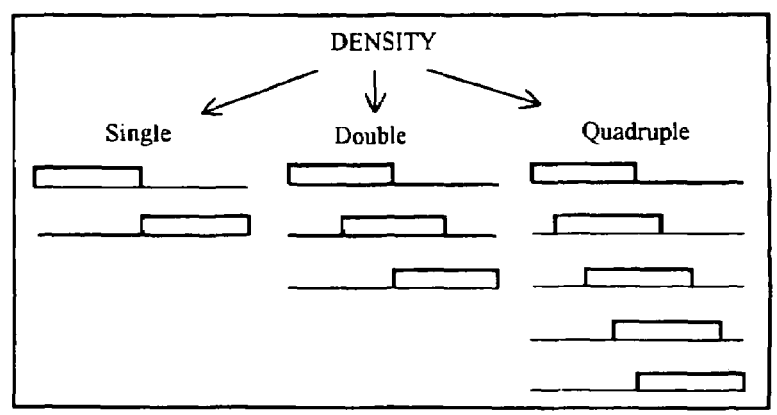
FIG. 4 shows single-density, double-density, and quadruple-density Haar-scale functions.

According to the degree of superposition, there is more or less redundancy in the encoding. The degree of superposition may be assimilated to the density of the scale and wavelet basis functions on the corresponding approximation spaces. With reference to the fraction of the extent of the support by which the translation is made, we will have single density, double density, or quadruple density according to whether the translation factor is equal to the extent of the support, is equal to ½ of the extent of the support, or is equal to ¼ of the extent of the support, respectively. FIG. 4 provides a one-dimensional example for the single-density, double-density, or quadruple-density Haar-base functions.

For the application in question, it is necessary to take into account the fact that the function of which the wavelet transform is to be calculated is an image quantized on the definition interval; the image is represented in matrix form. In this case, a translation of amounts less than ½ of the extent of the support is not defined.

Figure 5:
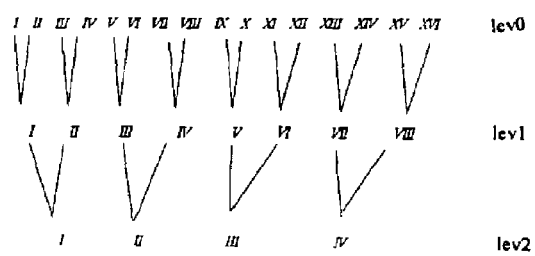
FIG. 5 illustrates the number of the scale and wavelet coefficients per level produced by single-density analysis.

In the Haar analysis, each wavelet detail coefficient at the level $j+1$ is a function of two scale coefficients of level $j$ through the filter operators. The extent of the support of the function corresponding to the filter thus covers a space of two coefficients. In single-density analysis, as has been said, the spatial translation is equal to the extent of the support and hence will shift by two coefficients at a time; i.e., the filter will operate on the next two coefficients in the string. In this way, there will be obtained at the level j+1 half of the coefficients that were obtained at the level j. In FIG. 5, the wavelet coefficient I of level 1 is a function of the scale coefficients I and II of level 0; the second wavelet coefficient of level 1 is a function of the scale coefficients III and IV of level 0, etc. At level 0 there are 16 pixels of the original image; at levels 1 and 2 there are 8 and 4 mean coefficients, respectively, to which there correspond as many wavelet detail coefficients.

Figure 6:
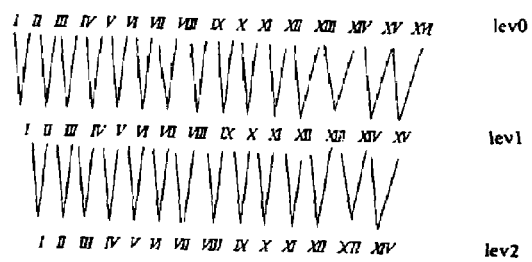
FIG. 6 illustrates the number of the scale and wavelet coefficients per level produced by double-density analysis.

In the case of double-density analysis, the support of the function corresponding to the filter does not change; consequently, it will always act on two coefficients for each operation. There is, instead, a change of the extent of the translation, which is equal this time to one half of the extent of the support. In this way, two consecutive wavelet coefficients of level j+1 will be a function of 2 pairs of scale coefficients of level j with a common coefficient. In FIG. 6, the wavelet coefficient I of level 1 is a function of the scale coefficients I and II of level 0; the second wavelet coefficient of level 1 is a function of the scale coefficients II and III of level 0. In this way, given n coefficients at level j, we shall have n−1 coefficients at level j+1. At level 0, there are 16 pixels of the original image; at levels 1 and 2 we have, respectively, 15 and 14 mean coefficients, corresponding to as many wavelet detail coefficients.

To obtain a multiresolution effect, the number of scale coefficients is halved every two double-density levels, with a linear subsampling operation; i.e., only the odd ordinal coefficients are retained in the sequence of coefficients of the level considered. In this way, the single-density coefficients of level j become comparable, as regards scale of resolution, to the double-density coefficients of level 2j.

The wavelet development is calculated for each of the squares produced by scanning at the various scales. In this way, for each level of decomposition, the three types of coefficients are obtained, namely horizontal, vertical and diagonal. At each level, these coefficients derive from a two-dimensional image; consequently, the three images of horizontal, vertical and diagonal wavelet development will be organized in two-dimensional matrices. If it is assumed that the levels 2, 4 and 6 of double-density overcomplete Haar-wavelet transforms are used, given an initial square of 64×64 pixels, in this configuration the following decomposition sequence will be obtained:

--- level 0 = square 64 × 64 as produced by the scanning module;
level 1 = (63 rows) × (63 columns) × (3 directions) wavelet coefficients;
level 2 = 62 × 62 × 3 wavelet coefficients;
at this point, the scale coefficients are subsampled to obtain 31 scale coefficients from the 64 given above for each direction;
level 3 = 30 × 30 × 3 wavelet coefficients;
level 4 = 29 × 29 × 3 wavelet coefficients;
at this point, the scale coefficients are subsampled to obtain 14 scale coefficients from the 29 given above for each direction;
level 5 = 13 × 13 × 3 wavelet coefficients;
level 6 = 12 × 12 × 3 wavelet coefficients.

---

For each of the two levels, the number of scale coefficients is halved, i.e., only the odd ordinal coefficients are considered, the aim being to limit the number of total coefficients and to maintain a multiresolution effect.

In fact, as a result of subsampling on the scale coefficients, at the next level two adjacent wavelet coefficients gather information from a pool of scale coefficients corresponding to areas that are wider in the original image. In this way, the grain of the scale of analysis becomes coarser.

If only the wavelet coefficients of levels 2, 4 and 6 are considered, the total number of coefficients is:

$$62 \times 62 \times 3 + 29 \times 29 \times 3 + 12 \times 12 \times 3 = 11532 + 2523 + 432 = 14487$$

The biggest contribution in terms of number is represented by the lower levels corresponding to a finer scale of resolution. It is to be noted that two adjacent squares produced by displacement of the scanning mask by 20 pixels will differ in the wavelet representation above all at the finer scales. The higher levels of decomposition in fact are less sensitive to translation.

In the preferred embodiment described herein, the Haar transform is used because it is the simplest and fastest to calculate and is the one that poses fewest problems of interpolation at the edge, this fact being of considerable importance, given that thousands of windows are analysed for each image processed.

The SVM classifier receives at input row vectors, which represent points in the resultant input space. It is therefore necessary to re-organize the wavelet-coefficient matrices into a single row vector. In the input space of the SVM classifier, each coefficient will identify a dimension. The modality of construction of the vector is strictly linked to the step of normalization of the vectors, which is of determining importance for the purposes of proper classification.

The encoding chosen for the characteristics vector is according to the following procedure:

(1)—each matrix is mapped in a single row vector, made up of all the rows of the matrix, set in sequence (for example, row 1, row 2, . . . , row n);

(2)—the row vectors constructed in point 1 are united in a single sequence of coefficients; the said row vectors are ordered according to increasing levels of decomposition and grouped together according to direction.

In this way, by choosing the overcomplete levels 2, 4 and 6, the prototype characteristics vector of 14487 elements will be structured as follows:

(horiz. lev. 2, horiz. lev. 4, horiz. lev. 6, vert. lev. 2, . . . , vert. lev. 6, diag. lev. 2, . . . , diag. lev. 6).

It is possible to introduce the term of "class of wavelet coefficients", referring to the set of coefficients identified by a level index and a direction index. Using three levels of decomposition and three directions, we will obtain nine classes of coefficients to make up the characteristics vector.

Before it is ready for classification, the vector must be normalized in order to ensure rapid convergence of the learning model and in order to balance the weights of the various characteristics.

Classification of a vector in a generalization step is based upon the learning model created, starting from the set of examples according to the learning parameters.

In the step of classification, the classifier loads into memory a set of triplets $(\bar{s}_i, \alpha_i, y_i)$, where each $\bar{s}_i$ is a support vector of the learning model generated, $\alpha_i$ is the corresponding Lagrangian multiplier and $$y_i = \begin{cases} +1, & \text{positive} \\ -1, & \text{negative} \end{cases}$$

is the class indicator.

The triplets specify the classification hyperplane resulting from the optimization during learning. During classification the classifier must use the same type of kernel as the one used during learning, with corresponding parameters.

At this point, for each new vector to be classified the decision rule is simply:

$$f(\bar{x}) = \text{sgn}\left(\sum_{\text{Support vectors}} \alpha_i y_i K^0(\bar{x}, \bar{s}_i) - b_0\right)$$

where $b_0$ is a constant linked to the position of the separating hyperplane, which can be expressed as a function of the triplets referred to above. The vectors $\bar{x}$ for which $f(\bar{x})=+1$ are classified as positive.

For each vector, the distance from the separation hyperplane is calculated. The said distance from the hyperplane is an index of confidence on the correctness of the classification. A vector classified as positive at a large distance from the hyperplane will have a higher likelihood of being a true positive as compared to a vector very close to the hyperplane, and hence close to the boundary area between the edges of the two classes. The value of said distance is saved, together with the co-ordinates of the corresponding square, with reference to the scale of the original mammographic image. The squares saved as positive are displayed to the radiologist as suspect regions.

In other words, the classifier provides, for all the squares analysed, a number indicating the probability that the area is of high interest or low interest. Said probability may be extremely helpful for identifying lesions which, given the fact that they resemble the environment in which they are located, might escape the notice of the radiologist.

Figure 7:
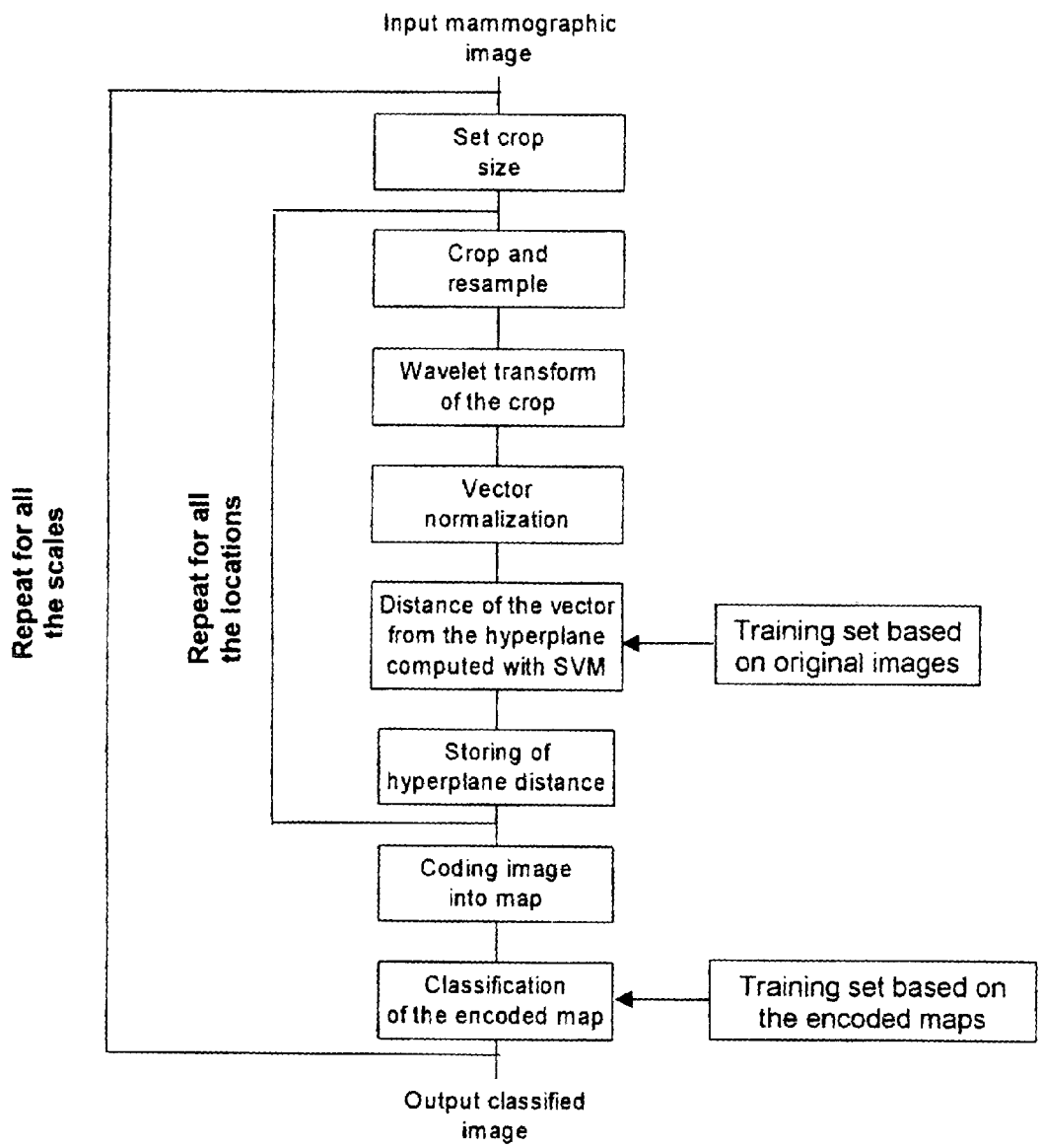
FIG. 7 illustrates a block diagram of another embodiment of a method of automatic detection according to the present invention.

Furthermore, the set of numerical values of the distances from the hyperplane represents a map, which can be used as a new non-linear encoding of the original image. With this encoding it is easier to gather useful information for the classification of the interesting regions. Indeed, from this map it is possible to extract helpful information regarding the local context of each area. This information is extremely important and it is not so easy to extract it from the previous encoding of the original image. Using the said information, without the need to work on the original image, it is possible to carry out a step of reduction of false alarms or a new classification task, by re-iterating the method forming the subject of the present invention, as illustrated in FIG. 7. For this purpose, it is sufficient to train a second classifier, which will receive at input this new encoding and a new set of positive examples and negative examples. It is worth remarking that the detection system automatically learns from the set of the examples, without needing any information by the trainer. Alternatively, it is also possible to provide a different encoding of the points of the map, using a wavelet encoding, as described previously.

In addition, the SVM classifier makes it possible to use profitably spaces with thousands of dimensions with training sets of the order of some thousands of examples. An SVM is not based upon the extent of the set of examples in order to reach a good generalization, but upon its significance at edge of distribution. For an SVM, only a part of the example vectors contributes to creating the learning model, the said vectors being referred to as support vectors. The smaller the percentage of support vectors, the better the generalization of the machine. The interpretative key lies in the fact that, for SVMs, the modelling of the classes is based upon the properties of the example vectors at the boundary edge between the two classes. The learning strategy of the SVM is not that of drawing out mean characteristics of the representatives of the two classes in order to create two prototype vectors, one per class, and to classify a new vector on the basis of its greater proximity to one prototype vector or the other. Instead, the SVM classifies a new vector according to its greater distance from the edge of one class or the other. For this reason, for the purposes of forecasting the behaviour of the machine in the generalization step, it is not useful to reason according to the mean properties of the characteristics. It should, however, not be thought that a new vector to be classified that has properties similar to the mean ones of a given class can be classified incorrectly. The new vector to be classified will in any case be classified correctly by maintaining the coherence of the learning process. What the SVM adds to the other classifiers is a better check of the boundary cases, the ones where it is more difficult to decide whether they belong to one class or the other. Since it has a sample of examples representing the distribution at the edges of the two classes, the machine will use these examples for drawing a map of boundary between the classes. In this way much fewer examples are required for carrying out generalization than would be necessary if it were required to model the entire distribution of the vectors of the class in order to draw out the mean properties. These considerations reflect upon the step of preparation of the set of training examples. In constituting said set, it has been necessary to take into account two requirements:

(a) providing cases that are representative of the distribution and variability of the examples of one class, endeavouring to represent as well as possible the edges of the distribution of the vectors of each class;

(b) providing many more examples of the negative class, i.e., the one that presents the greater internal variability; this is due to the fact that a problem of multiclassification is reduced to a binary classification of the type "class A"-"not class A".

In order to solve the above problem, it is possible to base the approach on the technique of "bootstrapping" for the training process. The basic idea implemented in this technique is to consider the formation of the training set as an iterative process oriented by the performance of the classifier. In practice, the starting point is a base set in which an attempt is made to provide a sample which is as representative as possible of the two classes. Then a learning model is generated based upon this set, so as to verify the performance of the system. All the new vectors incorrectly classified come to form part of the training set. In a certain sense, the machine is thus induced to learn from its mistakes. It is to be noted that the new example vectors, incorrectly classified according to the model learnt on the preceding set of examples, will constitute support vectors for the new model. In this sense, it is possible to increase the representativity of the set of examples with respect to the distribution of the class at the edge, without knowing the effective distribution of the vectors in the input space.

In the problem before us, this approach results in two different operations for the two classes. For the positive class, the incorrect classifications in the testing step are false negatives; therefore, in order to adjust the range of learning, it is necessary to consider which types of masses are not detected by the system and to represent them better in the training set. For the negative class, all the false-positive squares detected by the system are considered and are entered in the training set. It is to be noted that, in order to increase the set of negative examples, it is necessary to test the system on a set of normal mammographic images that do not present lesions and use the certain false positives possibly produced for these images as further new negative examples. Starting, then, from an initial training set, the said set is further populated according to the classification errors of the system, in order to eliminate types of false positives produced.

The main advantage of the present method lies in the fact that the detection system automatically adapts both to the type of image to be analysed and to the conditions of acquisition of said image. Furthermore, it is possible to search for regions of interest, without entering any information regarding the characteristics of the lesions that are to be detected.

The invention claimed is:

1. A method for automatic detection of regions of interest in a digital image representing at least one portion of biological tissue, said regions of interest being detected by classifying all regions of said digital image as suspect regions or not, using at least one classifier referred to as Support-Vector Machine (SVM), wherein said method further comprises:

providing a first set of positive examples representing suspect regions of said biological tissue;

providing a second set of negative examples representing non-suspect regions of said biological tissue;

providing a representation of said all regions, of said first set, of said second set, said representation being characterized by not entering any information regarding the characteristics of the regions that are to be detected;

generating a model for the detection of said regions of interest based on said representation of said first set and said representation of said second set using said Support-Vector Machine;

comparing said representation of said all regions of said digital image with said model for classifying said all regions of said digital image as suspect regions or not.

2. The method according to claim 1, characterized in that said representation is a wavelet representation.

3. The method according to claim 1, wherein said digital image represents mammary tissue.

4. The method according to claim 3, wherein said regions of interest represent tumoral masses.

5. The method according to claim 3, wherein said regions of interest represent microcalcifications or clusters of microcalcifications.

6. The method according to claim 1, wherein said digital image represents pulmonary tissue.

7. The method according to claim 1, wherein said digital image represents tissue corresponding to the digestive system.

8. The method according to claim 1, further comprising the following steps:

producing a second representation of said digital image, said second representation based on a map of the distances from a hyperplane obtained by using said SYM classifier; and, classifying said all regions as suspect regions or not, using a second SYM classifier on said second representation.

9. The method according to claim 8, wherein said digital image represents mammary tissue.

10. The method according to claim 9, wherein said regions of interest represent tumoral masses.

11. The method according to claim 9, wherein said regions of interest represent microcalcifications or clusters of microcalcifications.

12. The method according to claim 8, wherein said digital image represents pulmonary tissue.

13. The method according to claim 8, wherein said digital image represents tissue corresponding to the digestive system.

14. The method according to claim 1 designed for being implemented in an apparatus for processing and analysis of images of biological tissue.

15. An apparatus designed for implementing a method according to claim 1.

* * * * *